United States Patent [19]

Noda

[11] 4,317,976
[45] Mar. 2, 1982

[54] HIGH FREQUENCY HEATING APPARATUS

[75] Inventor: Tomimitsu Noda, Fuji, Japan

[73] Assignee: Tokyo Shibaura Denki Kabushiki Kaisha, Kawasaki, Japan

[21] Appl. No.: 50,786

[22] Filed: Jun. 21, 1979

[30] Foreign Application Priority Data

Jun. 28, 1978 [JP] Japan .................................. 53-78354
Jun. 28, 1978 [JP] Japan .................................. 53-78355
Jun. 28, 1978 [JP] Japan .................................. 53-78357
Jun. 28, 1978 [JP] Japan .................................. 53-78358
Jun. 28, 1978 [JP] Japan .................................. 53-78359

[51] Int. Cl.³ ........................ H05B 6/68; G06K 19/06
[52] U.S. Cl. ...................... 219/10.55 F; 219/10.55 R;
360/2; 235/494; 235/480
[58] Field of Search .................. 219/10.55 B, 10.55 R,
219/10.55 M, 506; 235/380, 61 PJ, 475, 480,
494, 493, 495, 436; 360/2; 364/404-406;
434/363, 364

[56] References Cited

U.S. PATENT DOCUMENTS 3,569,656 3/1971 White et al. .................. 219/10.55 B
4,011,428 3/1977 Fosnough et al. ........... 219/10.55 B
4,024,379 5/1977 Pfost et al. ........................... 235/380
4,158,759 6/1979 Mason .......................... 219/10.55 B
4,162,381 7/1979 Buck .............................. 219/10.55 B

FOREIGN PATENT DOCUMENTS 53-2743 1/1978 Japan ........................... 219/10.55 B

OTHER PUBLICATIONS

Toshiba Ad. Brochure, Toshiba ER-899BT-1, The Brain Wave TM (Model on Sale in U.S., May 1977).
Toshiba Ad. Brochure, Toshiba ER-798BT, The Touch Control Programmable MW Oven, on Sale May 1977.

Primary Examiner—B. A. Reynolds
Assistant Examiner—Philip H. Leung
Attorney, Agent, or Firm—Cushman, Darby & Cushman

[57] ABSTRACT

A high frequency heating apparatus, which is provided with a cooking card, and wherein a cooking program indicating a power level corresponding to a specified cooking time and a power level corresponding to a prescribed foodstuff temperature is preset in the cooking card; the data of the cooking program preset in the cooking card which are read out by a cooking card-reading device are stored in the corresponding addresses of a memory unit; cooking is carried out at a power level read out of the memory unit; and a cooking time and corresponding power level or a foodstuff temperature and corresponding power level are indicated on a display device.

9 Claims, 47 Drawing Figures

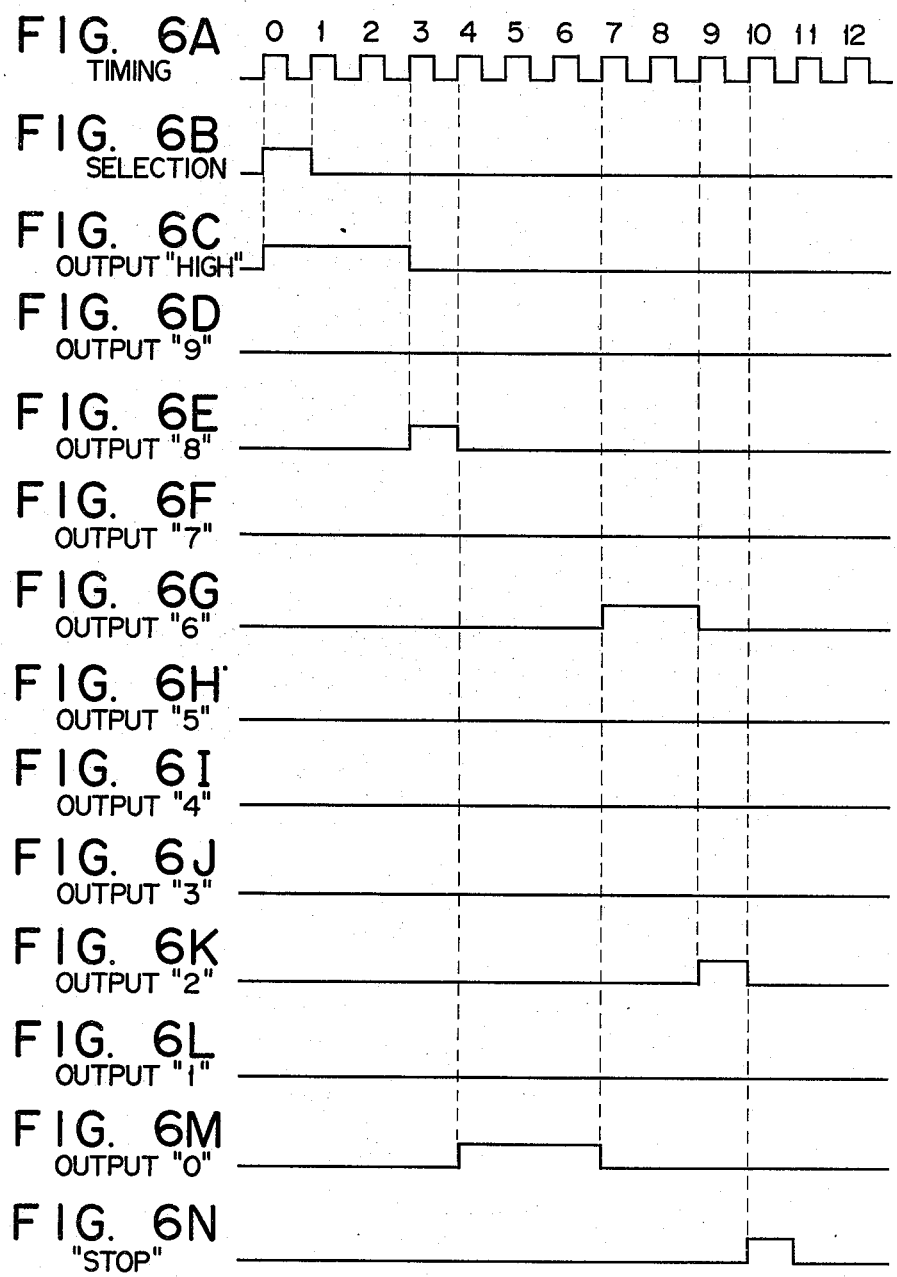

| COOK PROGRAM | | 4 BIT BINARY SIGNAL |
|---|---|---|
| POWER LEVEL SIGNAL | 0 | 0 0 0 0 |
| | 1 | 0 0 0 1 |
| | 2 | 0 0 1 0 |
| | 3 | 0 0 1 1 |
| | 4 | 0 1 0 0 |
| | 5 | 0 1 0 1 |
| | 6 | 0 1 1 0 |
| | 7 | 0 1 1 1 |
| | 8 | 1 0 0 0 |
| | 9 | 1 0 0 1 |
| | High | 1 0 1 0 |
| COOK STOP | | 1 0 1 1 |

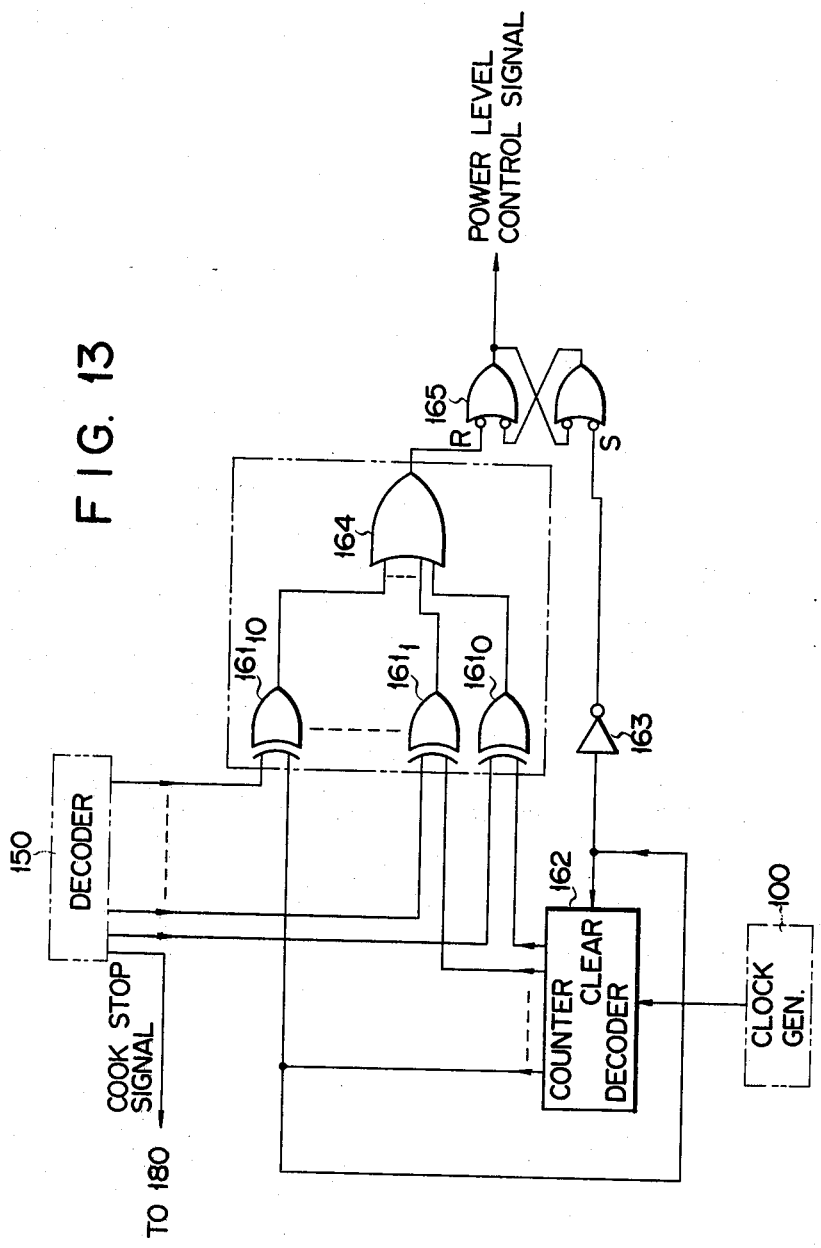

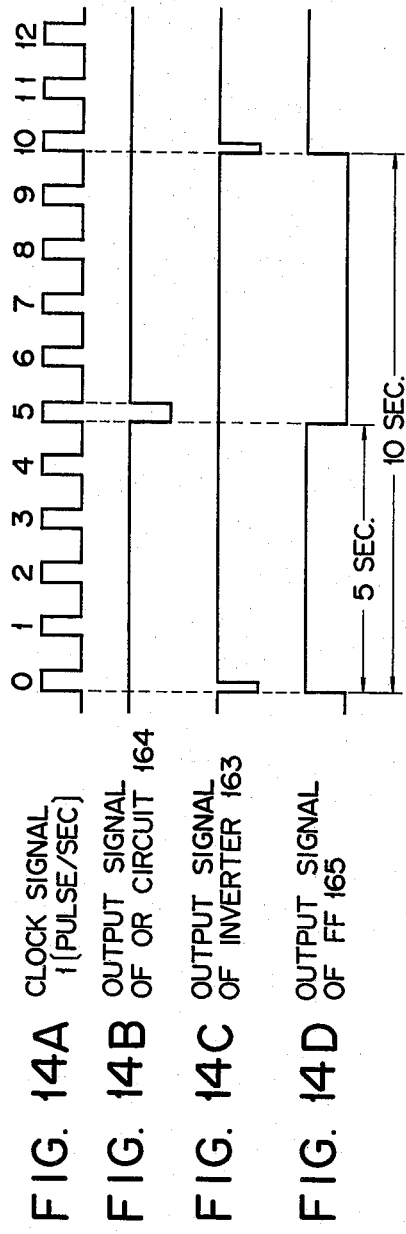
FIG. 14A CLOCK SIGNAL f(PULSE/SEC)
FIG. 14B OUTPUT SIGNAL OF OR CIRCUIT 164
FIG. 14C OUTPUT SIGNAL OF INVERTER 163
FIG. 14D OUTPUT SIGNAL OF FF 165
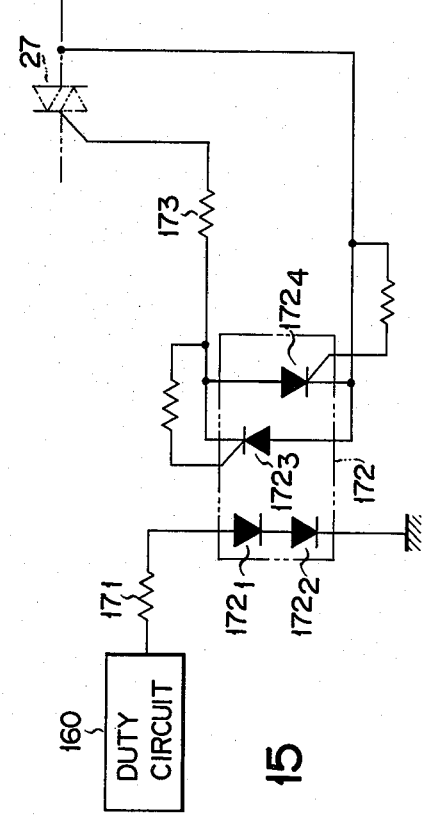
FIG. 15

| OUTPUT LEVEL | BINARY CODE | 7 SEGMENT LC DISPLAY |
|---|---|---|
| High | 1 0 1 0 | H |
| 9 | 1 0 0 1 | 9 |
| 8 | 1 0 0 0 | 8 |
| 7 | 0 1 1 1 | 7 |
| 6 | 0 1 1 0 | 6 |
| 5 | 0 1 0 1 | 5 |
| 4 | 0 1 0 0 | 4 |
| 3 | 0 0 1 1 | 3 |
| 2 | 0 0 1 0 | 2 |
| 1 | 0 0 0 1 | 1 |
| 0 | 0 0 0 0 | 0 |
| STOP | 1 0 1 1 | Ed |

FIG. 26

| TEMPERATURE (°C) | POWER LEVEL | COOK STOP | RAM ADDRESS |
|---|---|---|---|
| 40 | HIGH | — | 0 |
| 45 | HIGH | — | 1 |
| 50 | 6 | — | 2 |
| 55 | 6 | — | 3 |
| 60 | 4 | — | 4 |
| 65 | 4 | — | 5 |
| 70 | — | STOP | 6 |
| 75 | — | — | 7 |
| 80 | — | — | 8 |
| 85 | — | — | 9 |

FIG. 27

| TEMPERATURE (°C) | BINARY CODE | RAM ADDRESS |
|---|---|---|
| LOWER THAN 45 | 0 0 0 0 | 0 |
| 45 – LOWER THAN 50 | 0 0 0 1 | 1 |
| 50 – LOWER THAN 55 | 0 0 1 0 | 2 |
| 55 – LOWER THAN 60 | 0 0 1 1 | 3 |
| 60 – LOWER THAN 65 | 0 1 0 0 | 4 |
| 65 – LOWER THAN 70 | 0 1 0 1 | 5 |
| 70 – LOWER THAN 75 | 0 1 1 0 | 6 |
| 75 – LOWER THAN 80 | 0 1 1 1 | 7 |
| 80 – LOWER THAN 85 | 1 0 0 0 | 8 |
| HIGHER THAN 85 | 1 0 0 1 | 9 |

HIGH FREQUENCY HEATING APPARATUS

FIELD OF THE INVENTION

This invention relates to a high frequency heating apparatus which is designed to cook foods by electric waves having a high frequency of about 2450 MHz and whose various functions are digitally controlled.

PRIOR ART OF THE INVENTION

With the known high frequency heating apparatus, a program specifying time and electric output required to cook a particular kind of food has been supplied through a key switch. However, the prior art high frequency heating apparatus involves complicated key operations to define cooking conditions for each food. Further, the operator of the high frequency heating apparatus is liable to err in selecting the sequential key operations, thereby failing to carry out desired cooking.

To eliminate the above-mentioned drawbacks, another high frequency heating apparatus has been proposed in a patent disclosure No. 53-2743 (inventor: Shigeaki Masuzawa; and patent applicant: SHARP Corporation). With this proposed cooking apparatus, cooking conditions are controlled by a cooking card in which data on the required cooking conditions are stored in the form of digital codes. However, this proposed cooking device lacks means by which power output can be varied when the currently detected temperature of a foodstuff in the process of being cooked (hereinafter simply referred to as "the foodstuff temperature") has reached a prescribed level. The proposed cooking device also lacks the ability to display the level to which power output should be controlled to match cooking progress or foodstuff temperature. Consequently, said proposed cooking oven has the drawbacks that cooking power output can not be controlled to an optimum level for the foodstuff temperature; and since the cooking progress is not displayed, it is impossible for the user of said cooking oven to determine the cooking progress or whether a foodstuff has been properly cooked.

It is accordingly the object of this invention to provide a microwave oven for which there is used a cooking card supplied with a cooking program showing the level to which cooking power output should be controlled to match a length of time passed since the commencement of cooking (hereinafter referred to as "cooking time") or the foodstuff temperature. With the high frequency heating apparatus of this invention, therefore, accurate cooking conditions can be easily preset by reading data from said card. With respect to the same kind of food, the cooking oven according to the present invention can be repeatedly operated with a high degree of reproducibility. Further, it is possible visually to as certain by a display device the cooking time, currently applied power output, and foodstuff temperature.

To attain the above-mentioned object, this invention provides a high frequency heating apparatus comprising a cooking card means in which there is written the level to which power output should be controlled to selectively match the cooking time or foodstuff temperature;

reading means for reading data from said cooking card;

a memory means for storing data read out of the cooking program by means of the cooking card-reading means; and display means for indicating the cooking time, foodstuff temperature and a required level of cooking power output, when data is written from the cooking and into the memory means, and data on a required power output is read from said memory means.

This invention can be more fully understood from the following detailed description when taken in conjunction with the accompanying drawings, in which.

Figure 2:
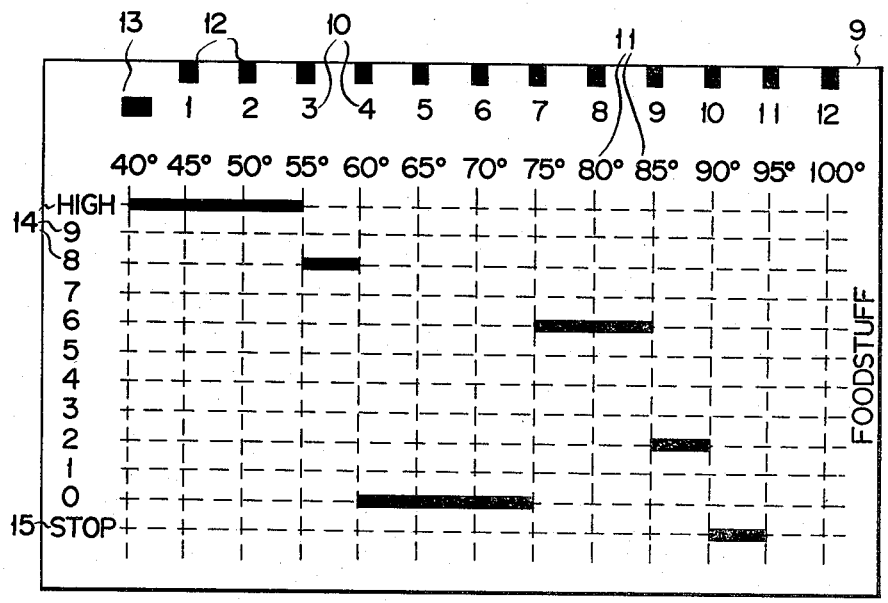
FIG. 2 shows a pattern in which data is written in a cooking card used in the high frequency heating apparatus of the invention.
Figure 3:
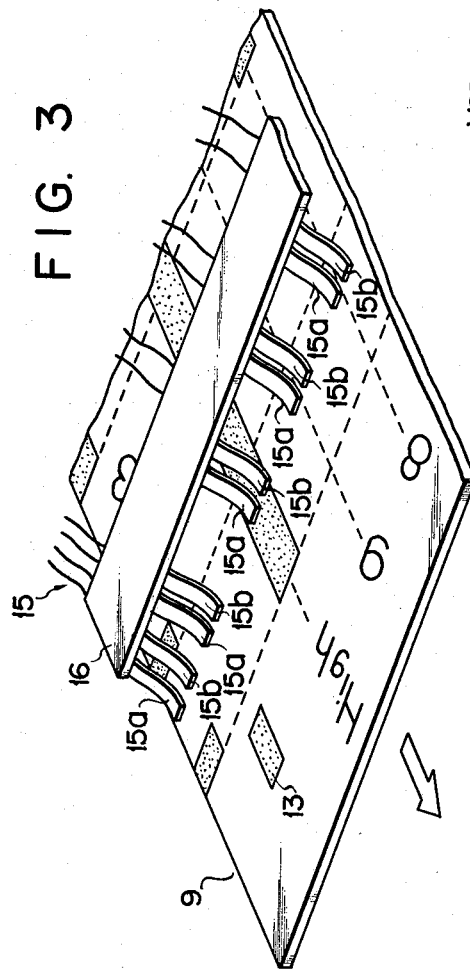
FIG. 3 is an oblique view of a cooking card data-reading device which reads data on the card shown in FIG. 2.
Figure 5:
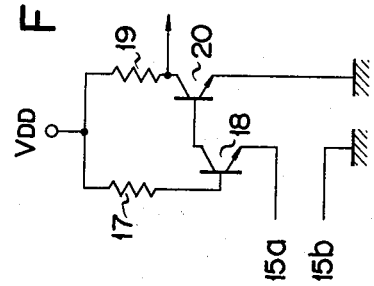
Figure 4:
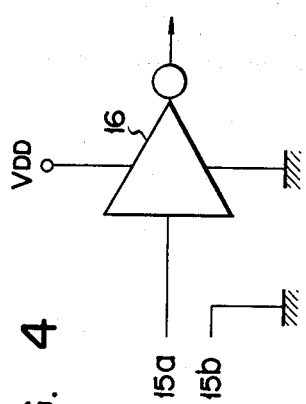
Figure 7:
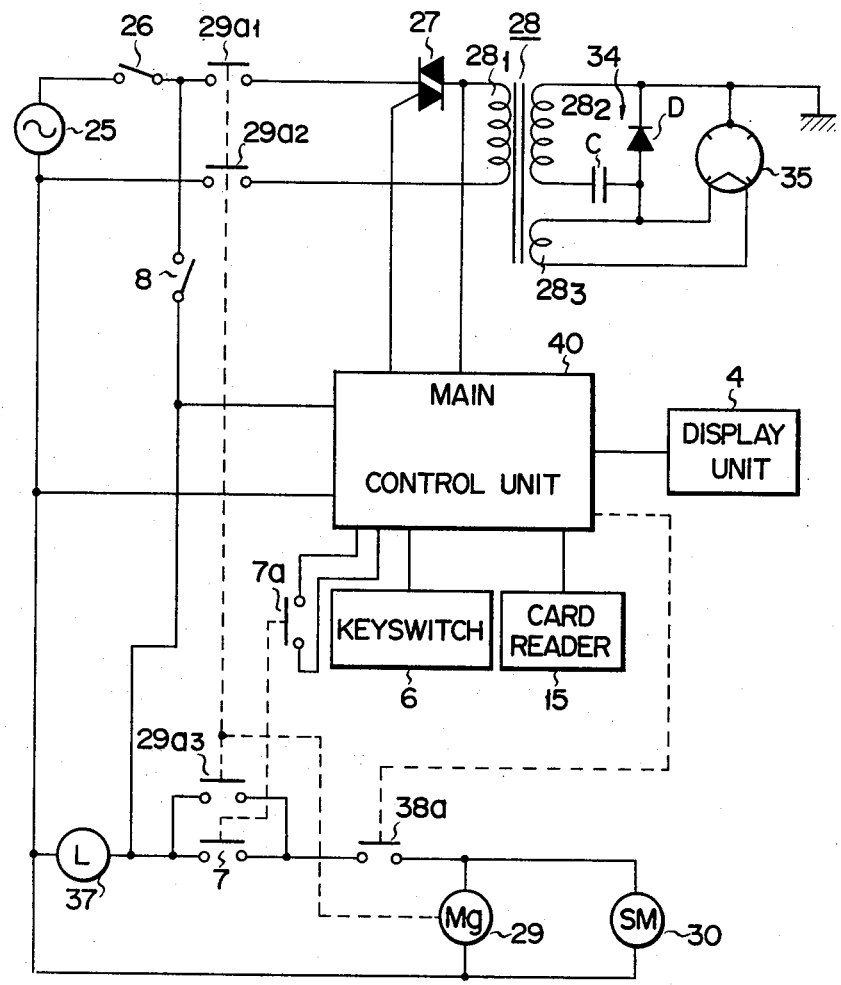
Figure 8:
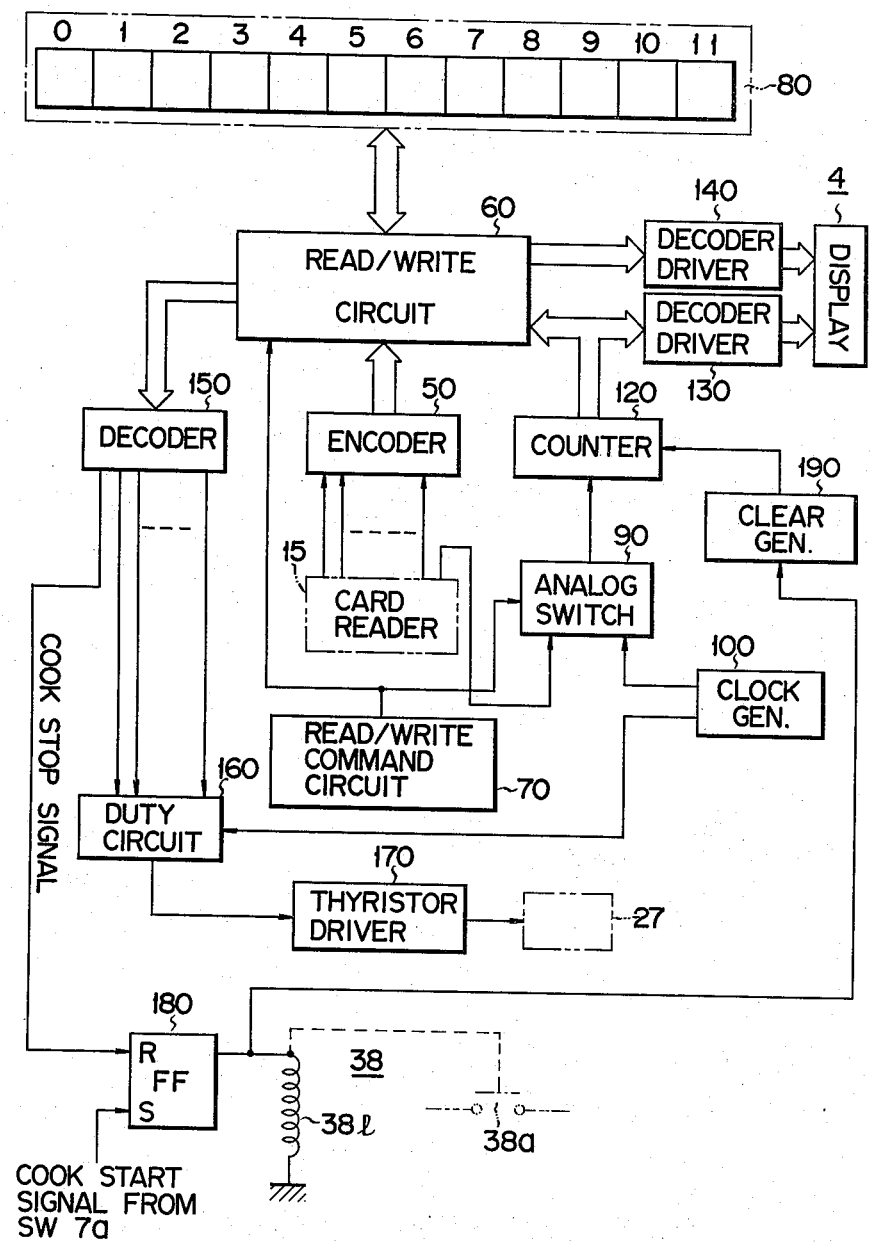
Figures 9, 10:
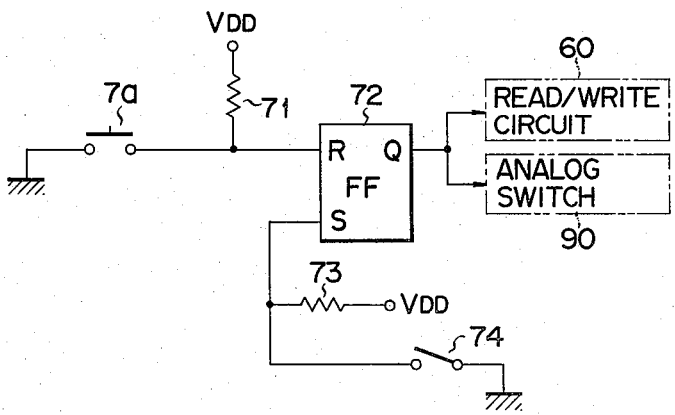
Figure 11:
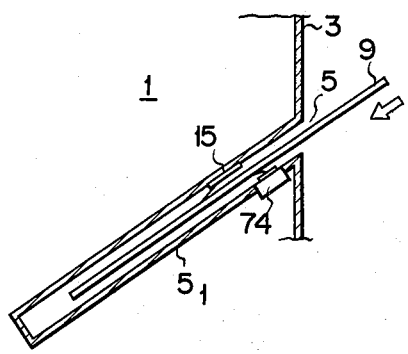
Figure 12:
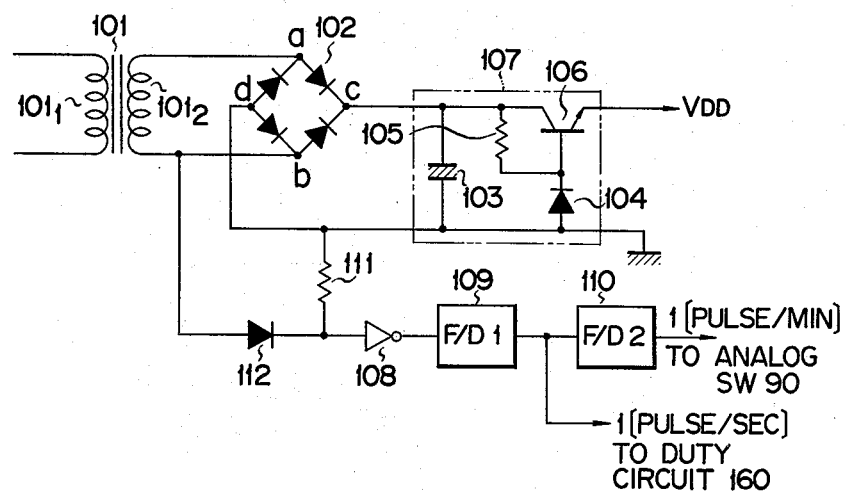
Figures 16, 17:
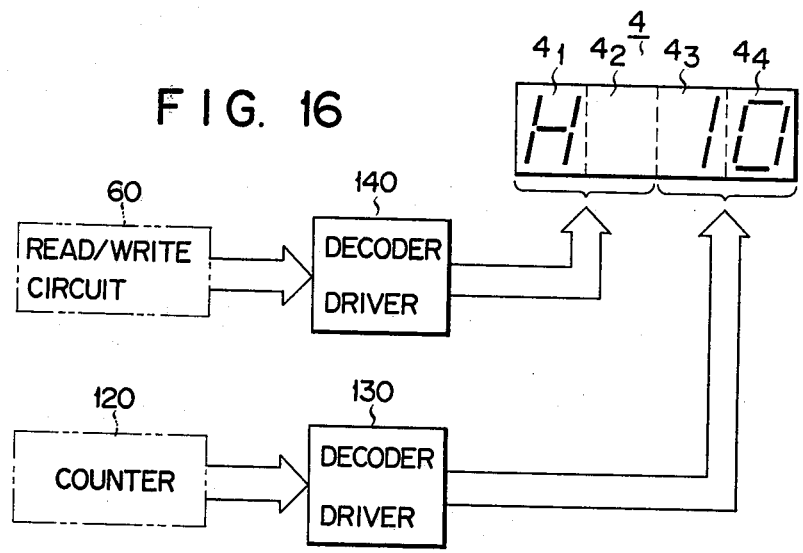
Figure 18:
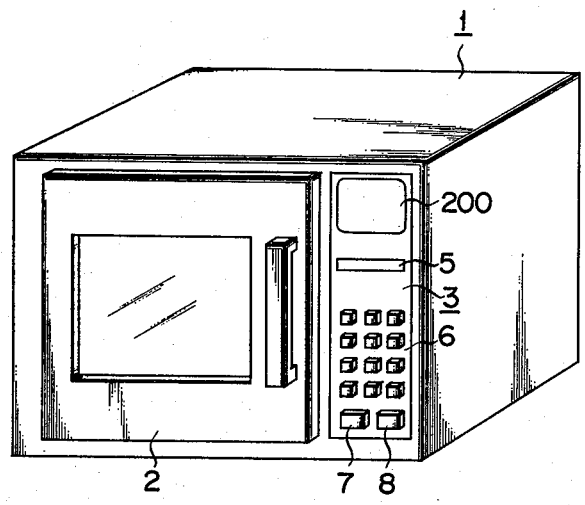
Figure 19:
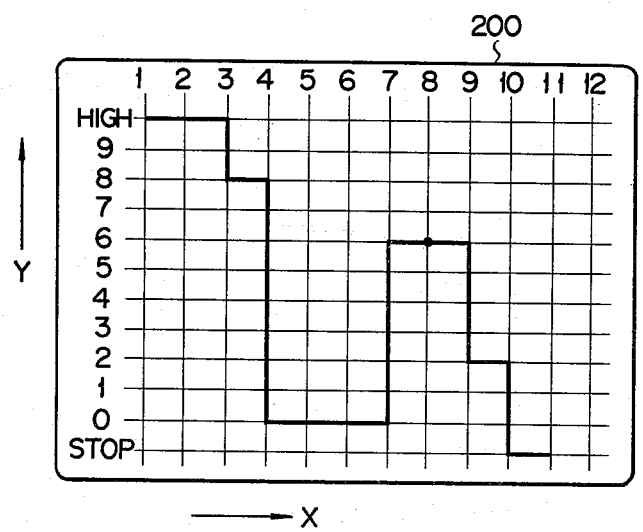
Figure 20:
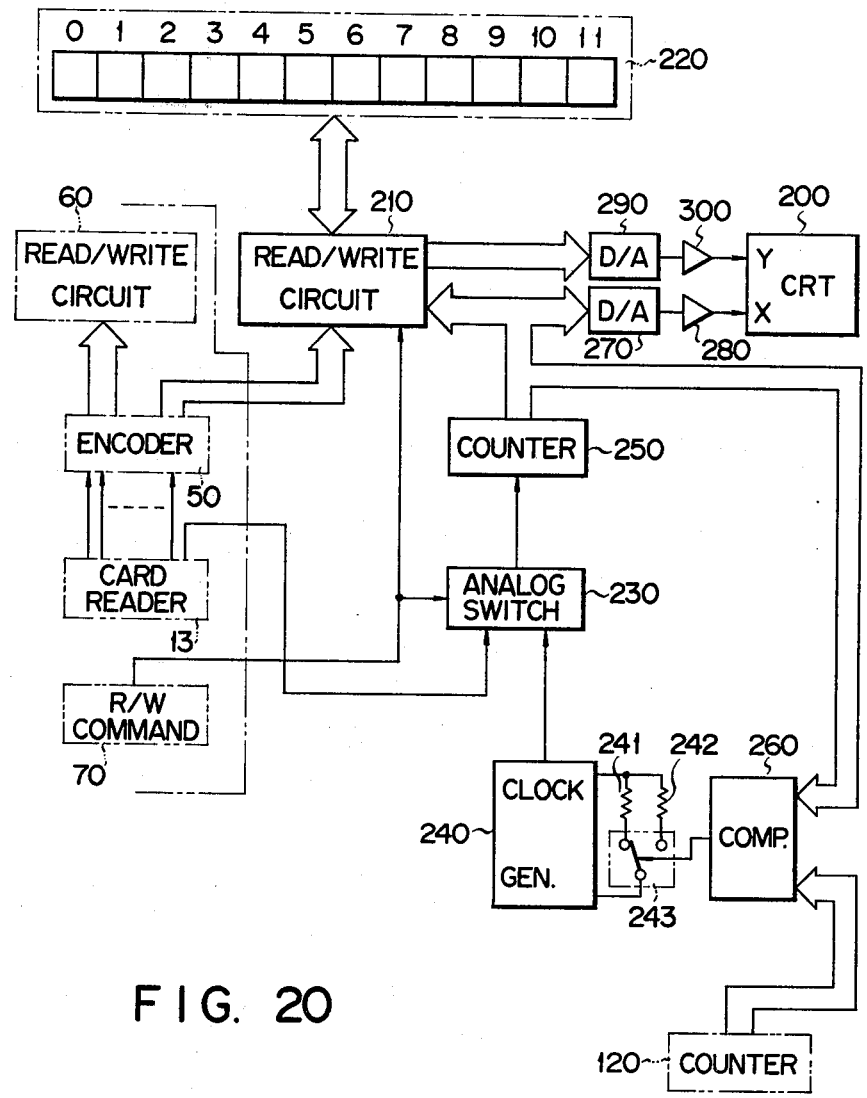
Figure 21:
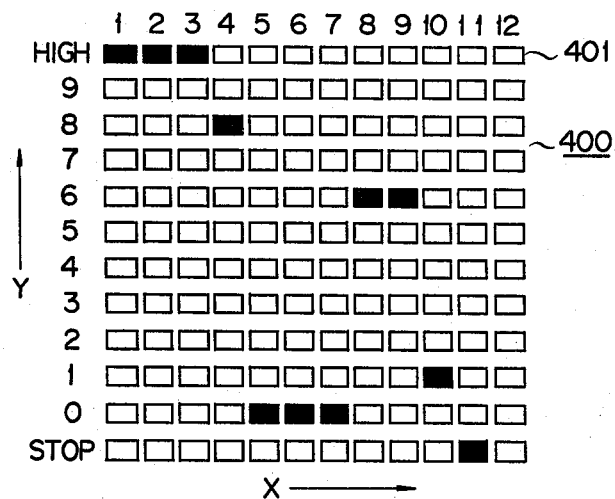
Figure 22:
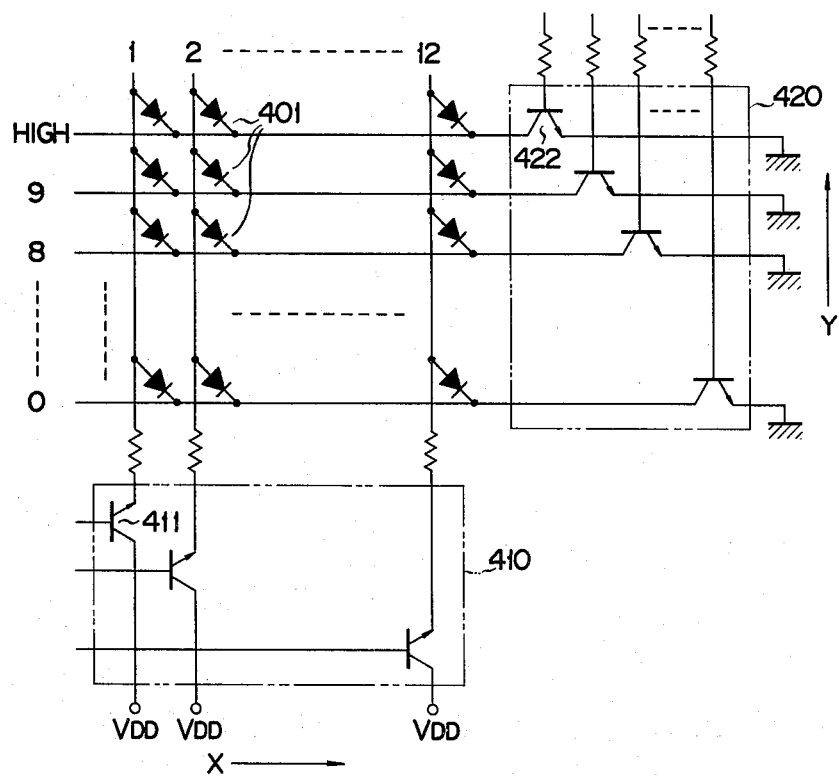
Figure 23:
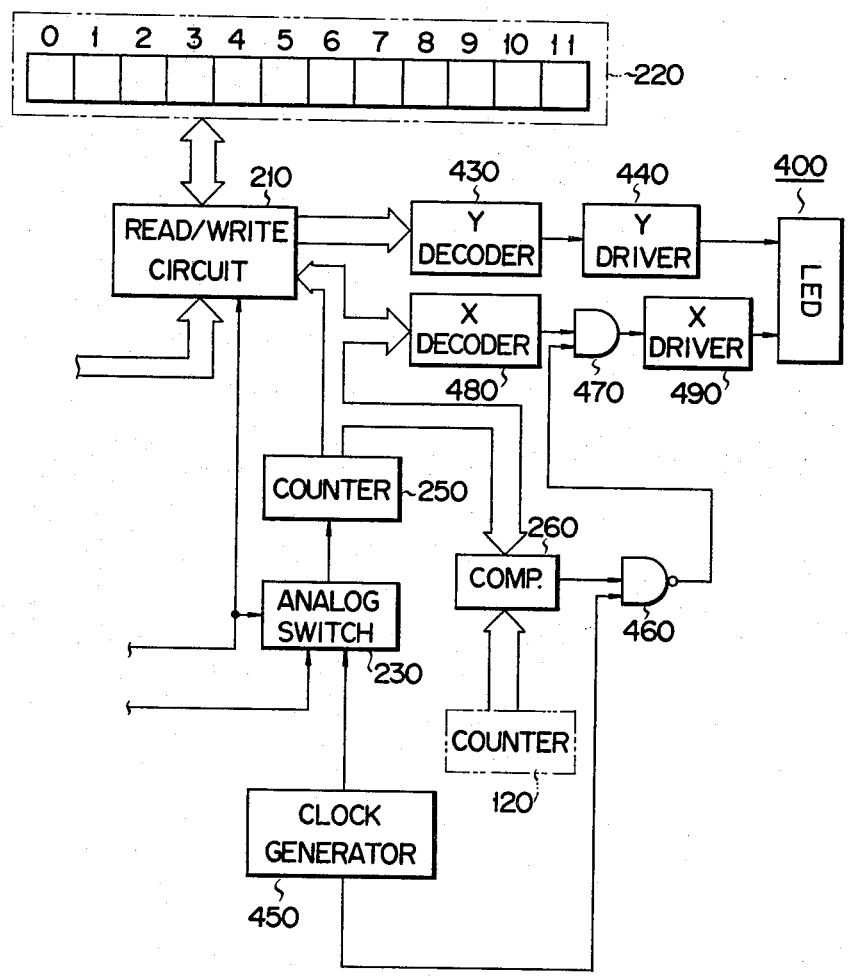
Figure 24:
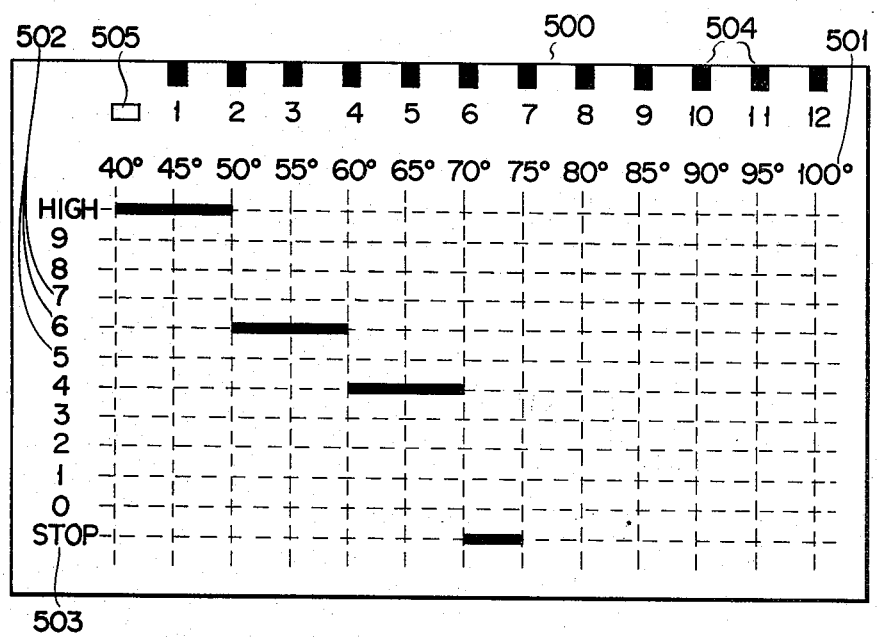
Figure 25:
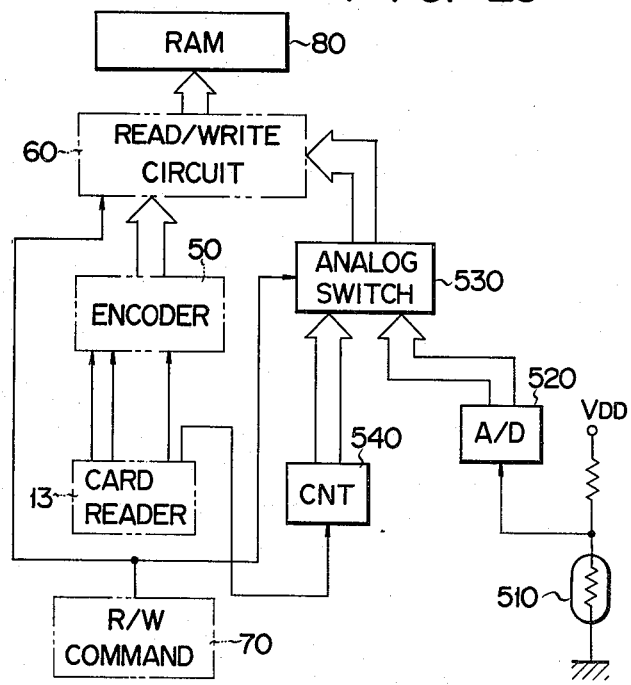
Figure 28:
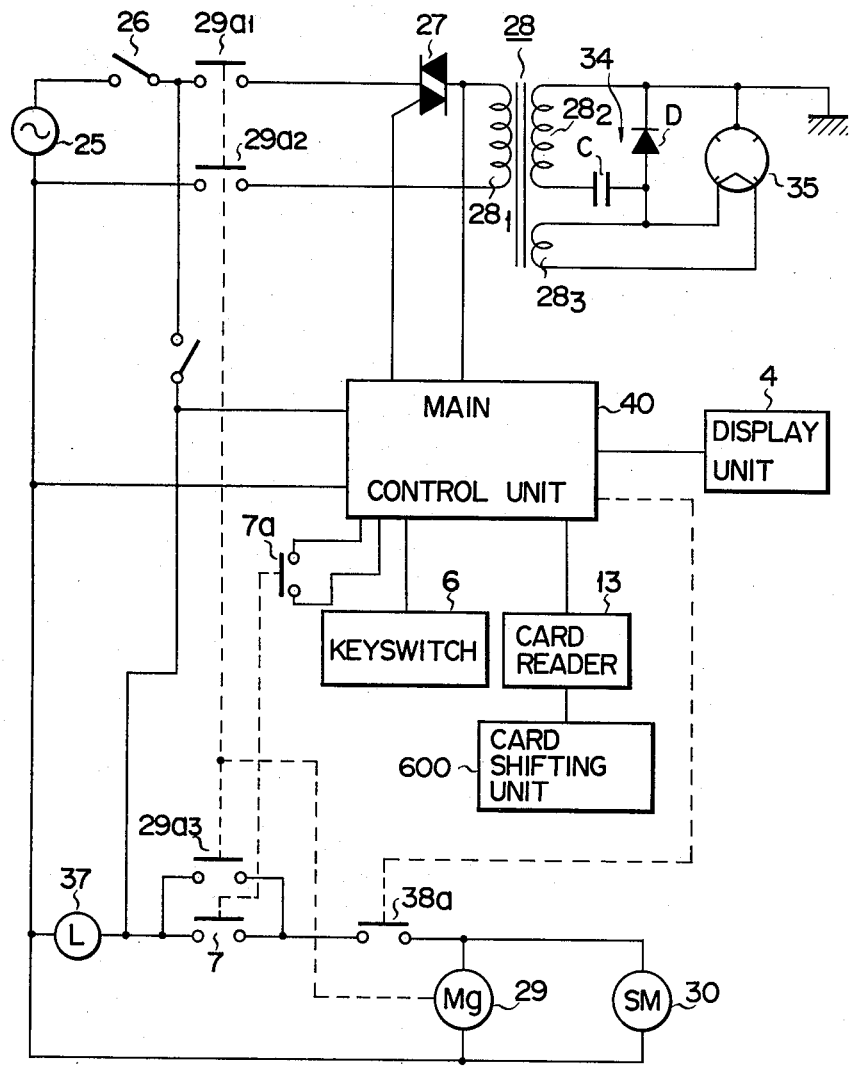
Figure 29:
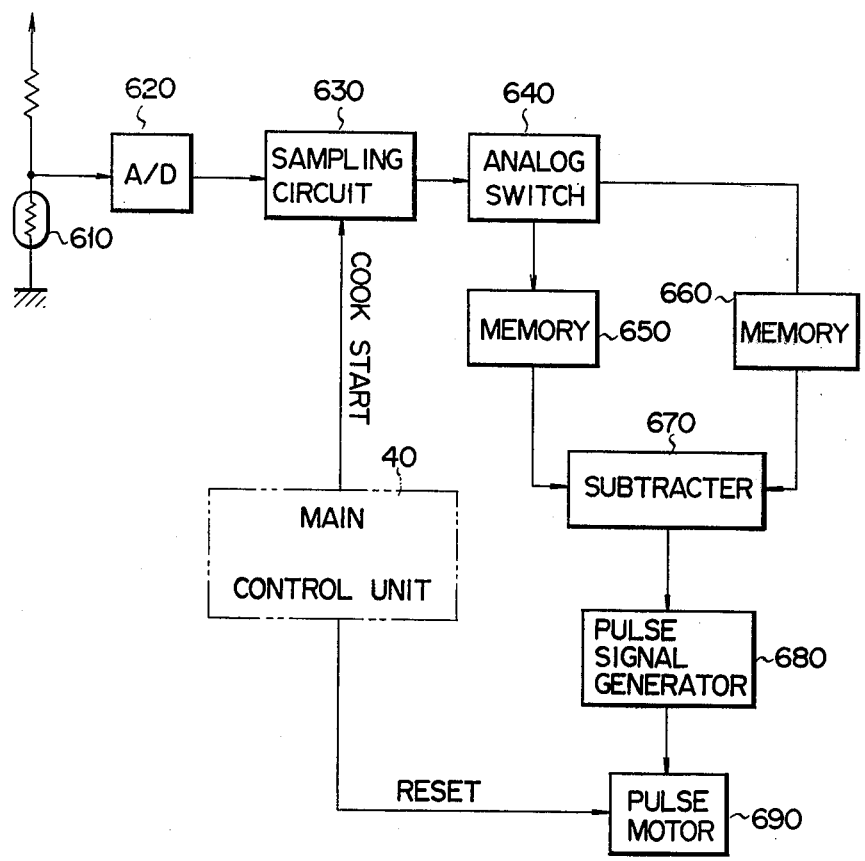
Figure 30:
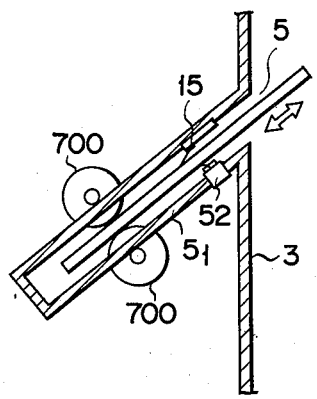
Figure 31:
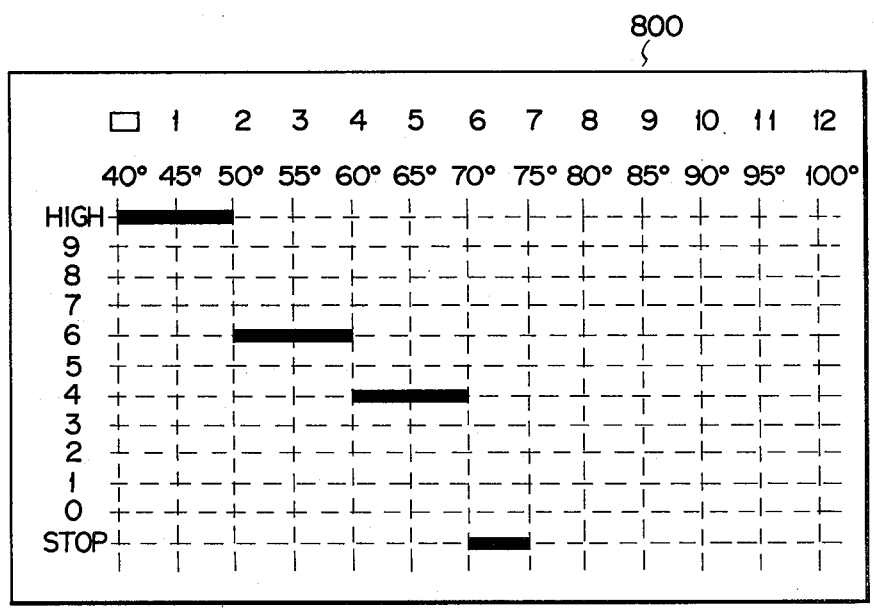

FIGS. 4 and 5 indicate the arrangements of circuits attached to the cooking card data-reading device of FIG. 3;

FIGS. 6A–6N are timing charts showing the levels of power output programmed in the cooking card of FIG. 2;

FIG. 7 shows the arrangement of a control circuit used with a microwave oven embodying this invention;

FIG. 8 is a concrete block circuit diagram of the main control section of FIG. 7;

FIG. 9 indicates 4-bit binary codes corresponding to power level signals programmed in a cooking card;

FIG. 10 shows the arrangement of a circuit for issuing an instruction to write cooking data in a memory or read cooking data therefrom;

FIG. 11 illustrates the relation of a microswitch used with the read-write instruction circuit of FIG. 10 and the cooking card;

FIG. 12 sets forth the arrangement of a clock signal generator in the control section in FIG. 8;

FIG. 13 shows the arrangement of a duty-defining circuit;

FIGS. 14A–14D are timing charts used with the duty-defining circuit of FIG. 13;

FIG. 15 indicates the arrangement of a thyristor-actuating circuit in the control section in FIG. 8;

FIG. 16 shows the arrangement of a digital display device in the control section in FIG. 8 and elements associated therewith;

FIG. 17 sets forth power levels of the digital display device shown in FIG. 16 and the corresponding binary codes and patterns of indications appearing on a 7-segment display device;

FIG. 18 is an oblique view of a high frequency heating apparatus according to another embodiment of the invention;

FIG. 19 shows the arrangement of a cathode ray tube in another embodiment shown in FIG. 18;

FIG. 20 indicates the arrangement of a display circuit for the cathode ray tube in another embodiment shown in FIG. 18;

FIG. 21 illustrates a pattern of indications appearing on the display device of a high frequency heating apparatus according to still another embodiment of the invention;

FIG. 22 sets forth the concrete arrangement of the display device of FIG. 21;

FIG. 23 shows the arrangement of a circuit for effecting an indication on the display device of FIG. 21;

FIG. 24 sets forth a pattern in which data is written in a cooking card modified from FIG. 2;

FIG. 25 shows the arrangement of a modification of the main control circuit used in the embodiment of the cooking card shown in FIG. 24;

FIGS. 26 and 27 show RAM addresses corresponding to datas written in a cooking program (in FIG. 27, binary codes corresponding to said datas are also shown) shown in FIG. 25;

FIG. 28 indicates the arrangement of a high frequency heating apparatus according to a further embodiment of the invention;

FIG. 29 is a concrete block circuit diagram of the modification of FIG. 28;

FIG. 30 illustrates that section of said embodiment which is provided with rollers shown in FIG. 28; and FIG. 31 illustrates a pattern in which data is written in a cooking card used with the embodiment of FIG. 28.

Figure 1:
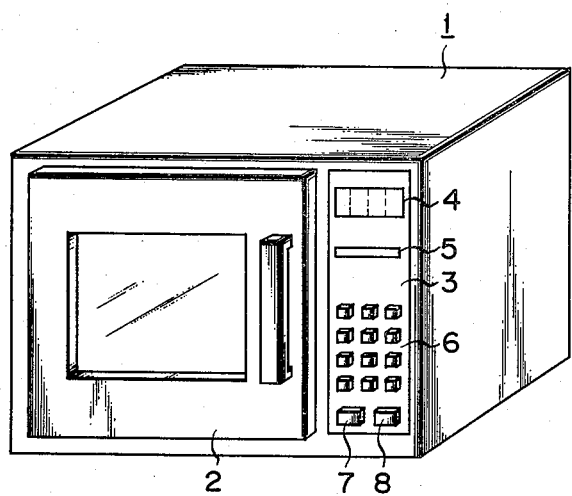
FIG. 1 is an oblique front view of a high frequency heating apparatus according to one embodiment of this invention.

There will now be described by reference to FIG. 1 a high frequency heating apparatus according to one embodiment of this invention.

A door 2 is operatively fitted to the front opening of a high frequency heating apparatus body 1. A cooking chamber (not shown) is provided in that section of the interior of the high frequency heating apparatus body 1 which faces the door 2. The cooking chamber contains a high frequency wave generator, for example, a magnetron (not shown) and a stirrer fan (not shown). The stirrer fan scatters high frequency waves issued from the magnetron through the cooking chamber for uniform cooking. A control panel 3 is provided on the front right side of the high frequency heating apparatus body 1. A 4-digit display device 4, for example, is set in the front upper portion of the control panel 3. A horizontally extending cooking card inlet slit 5 is formed a little above a horizontal control line of the control panel 3. Insertion of the later described cooking card enables a cooking program to be supplied to a cooking oven. Below the cooking card inlet slit 5 are arranged a plurality of key switches 6, which consist of data keys and function keys. Manual operation of the keyswitches 6 also enables a cooking program to be supplied to a high frequency heating apparatus. The display device 4 of, for example, the 4-digit type indicates currently required data and the corresponding power level included in a cooking program supplied normally by the insertion of a rectangular cooking card 9, or, if necessary, by the operation of the key switches 6. Provided in the lowermost section of the control panel 3 are a cooking-starting switch 7 and power switch 8. FIG. 2 illustrates a pattern in which data is written in the cooking card 9 used in the apparatus shown in FIG. 1. This cooking card 9 contains data on a required power level corresponding to the cooking time and also a required power level corresponding to the foodstuff temperature.

Printed along the upper edge of the rectangular cooking card 9 are data 10 on the cooking time divided in 12 divisions arranged from 1 minute to 12 minutes progressively increased at the rate of 1 minute per division, and also data 11 on the foodstuff temperature divided in 12 divisions arranged from 45° C. per division to 100° C. progressively increased at the rate of 5° C. Data sections 12 on power levels corresponding to the respective divisions of the cooking time data 10 and also the respective divisions of the foodstuff temperature data 11 are marked with conductive recording medium, for example, conductive ink. Further, a data section 13 is provided for selection of the cooking time 10 or the foodstuff temperature 11. When a high frequency heating apparatus user desires to detect the current cooking time, he previously marks said data section 13 with, for example, conductive pencil lead. When he wants to detect to foodstuff temperature, he uses a fresh cooking card and keeps said data section 13 unmarked. Indicated in the crosswise direction of the rectangular cooking card 9 are a graduated power level scale 14 written along the left edge of card 9 and divided into divisions ranging from "0" to "HIGH" and a cooking stop graduation 15. All these graduations are arranged at a prescribed interval. When a high frequency heating apparatus user smears any of said graduations with, for example, conductive pencil lead in conformity to a desired cooking time or foodstuff temperature, then it is possible to preset data on a required power level, or if necessary, data on the stoppage of cooking.

With the cooking card 9 of FIG. 2, the data-selecting section 13 is marked in black with conductive pencil lead to select cooking time. In this case, there is preset a cooking program in which a power level is preset at "HIGH" up to 3 minutes from the commencement of cooking; "8" from 3 to 4 minutes; "0" from 4 to 7 minutes; "6" from 7 to 9 minutes; "2" from 9 to 10 minutes; "stop" after 10 minutes. The lengths of time corresponding to the selected power levels are also marked in black with conductive pencil lead. A space is provided at one lengthwise end section of the rectangular cooking card 9 to indicate a name of a particular kind of foodstuff beeing cooked. The cooking card 9 is inserted into the inlet 5 (FIG. 1) from the left side thereof (FIG. 2). Provided in the cooking card inlet 5 of the high frequency heating apparatus body 1 is a cooking card-reading device 15 shown on FIG. 3.

A support board 16 of the cooking-reading device 15 is set substantially parallel with the cooking inlet 5. Fitted to one lateral side of the support board 16 are a plurality of pairs of brushes 15a, 15b. The respective paired brushes 15a, 15b correspond to the cooking time data sections 10, cooking temperature data sections 11, selection section 13 power level graduated scale 14 and cooking stop graduation 15. Power is conducted through the brushes 15a, 15b when they are pressed against any of the aforesaid markings made with conductive pencil lead. Each pair of brushes 15a, 15b is connected to a circuit of FIG. 4 or 5. With FIG. 4, the brush 15a is connected to the input terminal of an inverter 16, which is supplied with operation D.C. voltage $V_{DD}$. The other brush 15b is grounded. When the paired brushes 15a, 15b are rendered conducting by being pressed against any of the pencil lead markings on the cooking card 9, then the input terminal of the inverter 16 has a grounding potential, and the output terminal thereof has a high potential (and issues a signal having a logic level of "1"). Referring to FIG. 5, the D.C. voltage $V_{DD}$ is supplied through a resistor 17 to a transistor 18 whose emitter is connected to the brush 15a. The D.C. voltage $V_{DD}$ is further supplied through a resistor 19 to the collector of a transistor 20, whose emitter is grounded. The collector of the transistor 18 is connected to the base of the transistor 20. The brush 15b is grounded. When the brushes 15a, 15b are rendered conducting by being pressed against any of the conductive pencil lead markings on the cooking card 9, then the transistor 18 becomes operative, and the transistor 20 is turned off to cause the collector of said transistor 20 to have a high potential. When the cooking card 9 is inserted into the inlet 5, the cooking card-reading device 15 provides cooking program-presetting signals (FIG. 6), that is, a timing signal (FIG. 6A), selection signal (FIG. 6B) power level signals (FIGS. 6C to 6M) and cooking stop signal (FIG. 6N).

There will now be described the operation of a control circuit shown in FIG. 7. Connected to an A.C. power source 25 is a primary winding $28_1$ of a high tension transformer 28 through a series circuit consisting of the normally open contacts $29_{a1}$, $29_{a2}$ of the later described electromagnetic switch 29, and bidirectional thyristor 27. The secondary winding $28_2$ of the high tension transformer 28 is connected between the anode and cathode section of a high frequency generator 35, for example, a magnetron through a voltage doubler rectifier 34 formed of a capacitor C and diode D. The cathode of the magnetron 35 is connected to the secondary winding $28_3$ of the high tension transformer 28. Connected to the A.C. power source 25 is a lamp 37 through a series-connected power supply switch 8. The lamp 37 is used to illuminate the interior of a cooking chamber. Connected parallel to the lamp 37 is a first electromagnetic switch 29 through a series circuit consisting of the normally open cooking switch (pushbutton switch) 7 and a normally open contact 38a operated interlockingly with the later described main control unit 40. A normally open contact $29_{a3}$ of the first electromagnetic switch 29 is connected parallel to the cooking switch 7, to form a self-sustaining circuit. Connected parallel to the electromagnetic switch 29 is a stirrer fan motor 30. The main control unit 40 is connected to the A.C. power source 25 through a series circuit consisting of the door switch 26 and power switch 8.

The main control unit 40 is supplied with a cooking program-presetting signal from the switch 7a which generates a cooking start signal interlocked with the cooking switch 7, the key switch 6 or cooking card-reading device 15. The cooking program-presetting signal controls the operation of the bidirectional thyristor 27 and normally open contact 38a. The oerating condition of the main control unit 40, namely, the entire pattern of the preset cooking program, or part thereof, and the condition in which a foodstuff is being cooked in a microwave oven are indicated on the display device 4.

FIG. 8 schematically shows the arrangement of the main control unit 40. Among the cooking program-presetting signals issued from the cooking card-reading device 15, a power level signal and cooking stop signal are supplied to an encoder 50 to be converted into a 4-bit binary code. An output signal from the encoder 50 is conducted to a read-write circuit 60. When a read-write command circuit 70 sends forth, for example, a "write" command, then a output signals from the encoder 50, that is, a binary power level code and binary cooking stop code are supplied to, for example, a randam access memory (abbreviated as "RAM") 80. When the read-write command circuit 70 issues a "read" command to the read-write circuit 60, then the contents of the RAM 80, that is, a binary power level signal and binary cooking stop signal are read out. The RAM 80 has a memory capacity of "0" to "11" addresses. These addresses from "0" to "11" correspond to the respective graduations of a power level scale. Among the cooking program-presetting signals, the cooking time signal is supplied to an analog switch 90, which is supplied with clock pulses from a clock pulse generator 100 at the rate of one pulse per minute. When supplied with a "write" command from the read-write command circuit 70, the analog switch 90 selects any of the cooking time signals delivered from the cooking card-reading device 15. When supplied with a "read" command, the read-write command circuit 70 selects any of the clock pulses sent forth from the clock pulse generator 100. A cooking time signal or clock pulse produced from the analog switch 90 is counted by a counter 120. This counter 120 converts a cooking time signal an clock pulse into a binary code according a number of counts made by said counter 120. The encoded cooking time signal or clock pulse is conducted to both read-write circuit 60 and decoder-driver circuit 130. The decoder-driver circuit 130 decodes an output signal from the counter 120. The decoded signal is indicated on the display device 4.

When the cooking card 9 is inserted into the inlet 5 the read-write command circuit 70 issues a "write" command. When the cooking switch 7 is rendered conducting, the switch 7a interlocked with the cooking switch 7 is conducted and a "read" command is issued.

When the read-write command circuit 70 sends forth a "write" command, then a binary cooking time signal supplied to the read-write circuit 60 acts as a signal for specifying any of the addresses of the RAM 80. A binary power level signal and binary cooking stop signal delivered from the encoder 50 to the read-write circuit 60 as stored in any of the addresses from "0" to "11" of the RAM in accordance with the binary cooking time signal.

As seen from the cooking program preset in the cooking card 9 of FIG. 2, the addresses "0", "1" and "2" are applied with a binary power level signal corresponding to a power level of "HIGH". The address "3" is supplied with a binary power level signal corresponding to a power level of "8". The addresses "4", "5" and "6" are supplied with a binary power level signal corresponding to a power level of "0". The addresses "7" and "8" are supplied with a binary power level signal corresponding to a power level of "6". The address "9" is applied with a binary power level signal corresponding to a power level of "2", The address "10" is supplied with a binary cooking stop signal representing the stoppage of cooking. The binary power level signals and binary cooking stop signal stored in the RAM 80 are conducted to the decoder-driver circuit 130 to be indicated on the display device 4.

When the read-write command circuit 70 generates a "read" command, than the contents of the RAM 80 are successively read out, starting with the address of "0" at an interval of 1 minute, each time a binary clock signal is supplied to the read-write circuit 60. Among the binary codes read out of the read-write circuit 60, binary power level signals are supplied to the decoder-driver circuit 140 to be indicated on the display device 4.

Binary codes read out of the read-write circuit 60 are supplied to a decoder 150 (FIG. 8) to be converted into the original power level signals and cooking stop signal. Among the decoded signals, the power level signals are conducted to a duty-defining circuit 160.

The duty-defining circuit 160 is supplied with clock pulses from the clock pulse generator 100 at the rate of one pulse per second, and produces an output control signal corresponding to the power level signal upon receipt of said clock pulse. An output control signal sent forth from the duty-defining circuit 160 is supplied to a thyrister-actuating circuit 170, an output signal from which is supplied to the gate of the bidirectional thyristor 27 to control its conduction. Thereby, the magnetron 35 is rendered conducting or nonconducting as needed to effected cooking with power having a desired level. A cooking stop signal sent forth from the decoder 150 is conducted to a reset terminal of a flip-flop circuit (hereinafter referred to as an "FF circuit") 180. When cooking is commenced by the throw-in of the cooking switch 7, the FF circuit 180 is set by the switch 7a. A set output therefrom is supplied to a second electromagnetic device 38 provided with the normally open contact 38a.

While the FF circuit 180 remains set, the second electromagnetic device 38 is operated through the excitation of an excitation coil 38l.

When the FF circuit 180 is reset by a cooking-stop signal issued from the decoder 150, the normally open contact 38a is released, and the first electromagnetic switch 29 is cut off from the A.C. power source 25, thereby opening the normally open contact $29a_1$, $29a_2$ and $29a_3$ to stop cooking.

An output signal from the FF circuit 180 is supplied to a clear signal generator 190. This clear signal generator 190 sends forth a clear signal to the counter 120 when the FF circuit 180 is set, namely, cooking is commenced, and when the FF circuit 180 is reset, namely, cooking is brought to an end. As a result, the counter 120 is cleared of its contents.

When the counter 120 is cleared of its contents at the commencement and stoppage of cooking, the writing of data in the RAM 80 on the reading of data therefrom is commenced, starting with the address of "0".

A cooking power level signal stored in the RAM 80 is expressed in a 4-bit binary code as shown in FIG. 9. Cooking power levels ranging from "0" to "9" are denoted by the corresponding binary codes. A power level of "HIGH" is represented by a binary code showing "10". Stoppage of cooking is indicated by a binary code denoting "11".

With the foregoing embodiment, the RAM 80 is chosen to have a capacity of 12 addresses. However, application of this invention is not restricted to this arrangement. Obviously, the RAM 80 can have its capacity increased or decreased by applying the known RAM technique. Further with the above-mentioned embodiment, the RAM 80 is designed to store data on the conditions of cooking continued for a period of 12 minutes as measured from the commencement of cooking. However, it is possible for the RAM 80 to have a sufficiently large memory capacity to provide power level data for cooking continued, for example, one hour or a small memory capacity just enough to provide power level data for cooking lasting for as short a length of time as scores of seconds.

There will now be described the arrangement of the circuit of the main control unit 40 and that of the clock pulse generator 100.

The read-write command circuit 70 is arranged as shown in FIG. 10. One end of a switch 7a interlockingly operated with the cooking switch 7 is supplied with D.C. voltage $V_{DD}$ through a resistor 71. The other end of said interlockingly operated switch 7a is grounded. A junction between the resistor 71 and switch 7a is connected to a reset terminal of an FF circuit 72, whose set terminal is supplied with D.C. voltage $V_{DD}$ through a resistor 73. A junction between the set terminal of the FF circuit 72 and the resistor 73 is grounded through a normally open switch 74. This normally open switch 74 is constituted by a microswitch disposed on the open side of a cooking card guide path $5_1$ extended from the cooking card inlet 5 to the interior of the high frequency heating apparatus body 1. The microswitch 74 is rendered conducting when a cooking card 9 is inserted into the inlet 5, causing the FF circuit 72 to be set. A set output signal from the FF circuit 72 is used as a "write command".

When the switch 7a interlockingly operated with the cooking switch 7 is rendered conducting, a reset output signal from the FF circuit 72 is used as a "read" command. The "write" and "read" commands are supplied to the read-write circuit 60 and analog switch 90.

FIG. 12 shows the arrangement of the clock pulse generator 100. A power supply circuit is attached to the clock pulse generator 100 to supply D.C. voltage $V_{DD}$ to the circuits of the main control unit 40.

A primary winding $101_1$ of a transformer 101 is connected to the A.C. source 25 through a series circuit consisting of the door switch 26, and normally open contacts $29_{a1}$, $29_{a2}$. A secondary winding $101_2$ of the transformer 101 is connected to the input terminals a, b of a diode bridge type full-wave rectifier 102. The output terminals c, d of the full-wave rectifier 102 are connected to a constant voltage circuit 107 which is formed of a capacitor 103, zener diode 104, resistor 105 and NPN type transistor 106. The constant voltage circuit 107 generates D.C. voltage $V_{DD}$, which is supplied to the read-write circuit 60 and other circuits. One end of the secondary winding $101_2$ of the transformer 101 is connected to the input terminal of an inverter 108 through a diode 112 in the forward direction. A junction between the diode 112 and inverter 108 is grounded through a resistor 111. The output terminal of the inverter 108 is connected to the input terminal of a first frequency divider 109, whose output terminal is connected to the input terminal of a second frequency divider 110. The first frequency divider 109 divides the frequency of an output signal from the inverter 108 which has a frequency the same as that of the A.C. source 25 (for example, 50 Hz) into 50 equal parts, thereby generating clock pulses at the rate of one pulse per second. These clock pulses are supplied to the duty-defining circuit 160. The second frequency divider 110 divides an output clock pulse issued per second from the first frequency divider 109 into 60 equal parts. Therefore, one full clock pulse is generated per minute and supplied to the analog switch 40.

With the foregoing embodiment, the time base of the clock pulse generator 100 was taken to be 1 (pulse/min). Consequently, cooking power level was made to appear on the display device per minute. However, it is possible to display cooking power level per second or hour by changing the above-mentioned time base into a mode of 1 (pulse/sec) or (pulse/hr).

FIG. 13 shows the arrangement of the duty-defining circuit 160. Output per level signals from the decoder 150 are supplied to one of the input terminals of respective exclusive OR circuits $161_0$, $161_1$, ... $161_{10}$. An output signal from the decoder 150 which represents a power level of "0" is supplied to the exclusive OR circuit $161_0$. A power level signal corresponding to a power level of "1" is conducted to the exclusive OR circuit $161_1$. A power level signal denoting a power level of "HIGH" is delivered to the exclusive OR circuit $161_{10}$. The other input terminals of the exclusive OR circuits $161_0$, $161_1$ ... $161_{10}$ are supplied with output decoded signals from a counter-decoder 162. The counter-decoder 162 counts encoded clock pulses received from the clock pulse generator 100 at the rate of one pulse per second and decodes a counted number of encoded clock pulses. The decoded data is supplied to the exclusive OR circuits $161_0$, $161_1 \ldots 161_{10}$. When the counter-decoder 162 is cleared of its contents, then a signal having a logic level of "1" is supplied to the other input terminal of the exclusive OR circuit $161_0$. When the counter-decoder 162 makes a count of "1", a signal having a logic level of "1" is supplied to the other input terminal of the exclusive OR circuit $161_1$. When the counter-decoder 162 counts "10", a signal having a logic level of "1" is supplied to the other input terminal of the exclusive OR circuit $161_{10}$. This signal having a logic level of "1" is delivered to the clear terminal of the counter-decoder 162 and an inverter 163.

Output signals from the exclusive OR circuits $161_0$, $161_1 \ldots 161_{10}$ are supplied to the correspdonding input terminals of an OR circuit 164, output signal from which is conducted to the reset terminal of an FF circuit 165. The input terminal of this FF circuit 165 is supplied with an output signal from the inverter 163. When clock pulses supplied from the clock pulse generator 100 are counted to "10" by the counter-decoder 162, then said counter 162 is cleared of its contents. As a result, the inverter 163 produces a signal having a logic level of "0" per 10 seconds, causing the FF circuit 165 to be set. When the decoder 150 generates an output signal corresponding to a power level of, for example, "5" as shown in FIG. 14, then the OR circuit 164 sends forth an output signal having a logic level of "1", causing the FF circuit 165 to be reset. Thus, this FF circuit 165 is alternately set and reset during every 10-second period with a duty cycle takes to be 5/10 or ½. An output signal from the FF circuit 165 is used as a control signal corresponding to a power level of "5".

FIG. 15 indicates the arrangement of a thyristor-actuating circuit 170. An output control signal from the duty-defining circuit 160 is supplied through a resistor 171 to one end of a series circuit formed of light-emitting diodes $172_1$, $172_2$ included in a thyristor photocoupler 172. The other end of said series circuit is grounded. Photothyristors $172_3$, $172_4$ are provided to match the light-emitting diodes $172_1$, $172_2$. One end of said photothyristors $172_3$, $172_4$ is connected to the gate of the bidirectional thyristor 27 through a seriesconnected resistor 173. The other end of said photothyristors $172_3$, $172_4$ respectively is connected to a pole of the bidirectional thyristor 27 opposite to its gate. When, therefore, the duty-defining circuit 160 produces an output signal having a logic level of "1", then the bidirectional thyristor 27 is rendered conducting.

FIG. 16 shows a correlation between the display sections of the display device 4 and decoder-drivers 130, 140. The display device 4 consists of 7-segment type liquid crystal display sections $4_1$, $4_2$, $4_3$, $4_4$. The decoder-divider 130 decodes a cooking time signal or clock pulse supplied from the counter 120 for 7-segment type liquid crystal display. The decoded signals are supplied to the display sections $4_3$, $4_4$. The decoder-driver 140 decodes a binary power level signal supplied from the read-write circuit 60, as shown in FIG. 17, for 7-segment type liquid crystal display. The decoded signals are delivered to the display sections $4_1$, $4_2$. When a cooking program written in the cooking card 9 is read out by the cooking card-reading device 15. Then data on power level are successively indicated are shown on the display sections $4_1$, $4_2$. And data on cooking durations are shown on the display sections $4_3$, $4_4$. In this case, the cooking card-reading device 15 is made to read data from the cooking program at such a low speed as enables a high frequency heating apparatus user fully to recognize indications on the respective display sections $4_1$, $4_2$, $4_3$, $4_4$ of the display device 4.

There will now be described the operation of a high frequency heating apparatus arranged as described above.

First, a high frequency heating apparatus user throws in the power supply switch 8, and places a foodstuff being cooked in a cooking chamber. When the apparatus door is closed, the lamp 37 illuminates the interior of the cooking chamber. A prescribed cooking program is written in the cooking card 9 by smearing the desired section of the program with, for example, conductive pencil lead. The cooking card 9 is inserted into the inlet 5, starting with that side of the card 9 on which there is indicated a cooking time of "0". If, in this case, there is already prepared a cooking card 9 on which a required cooking program is written, then it is advised to use said card, instead of providing a fresh cooking card of the same content. When the cooking card 9 is inserted into the inlet 5, the microswitch 74 of FIG. 11 is rendered conducting. Data is read from the cooking program by the cooking card-reading device 15.

Now let it be assumed that data on a cooking time is selected. Then data on the selected cooking time, data on a power level corresponding to said cooking time and data on the stoppage of cooking are read out. A cooking time signal is supplied to the analog switch 90. A power level signal and cooking stop signal are delivered to the encoder 50. Since, at this time, a "write" command is issued from the read-write command circuit 70, the analog switch 90 delivers a cooking time signal supplied from the cooking card-reading device 15 to a counter 120. The counter 120 counts bits constituting an encoded cooking time signal. The control binary coded cooking time signal is supplied to a decoder-driver circuit 130 and read-write circuit 60. The contents of the counter 120 are indicated on the display device 4 through the decoder-driver circuit 130.

The read-write circuit 60 receives a "write" command from the read-write command circuit 70. A binary power level signal supplied from the encoder 50 and a binary cooking stop signal are stored in the RAM 80 in accordance with a binary cooking time signal supplied from the counter 120.

A binary power level signal and a binary cooking stop signal delivered from the read-write circuit 60 are indicated on the display device 4 through the decoder-driver circuit 140. A binary cooking time signal is also indicated on the display device 4 through the decoder-driver circuit 130. It is possible to recognize from all said indications those items of a cooking program which are currently applied. When the cooking card 9 is inserted into the inlet 5 up to the end, preparations are fully made for cooking.

When the cooking switch 7 is operated, the switch 7a interlocking operated therewith is closed, causing the FF circuit 180 to be set. The contact 38a of the second electromagnetic switch 38 is closed to actuate the electromagnetic switch 29. When the normally open contact $29_{a3}$ of this switch 29 is closed, a self-sustaining circuit is formed. As a result, a stirrer fan in the cooking chamber is rotated by the stirrer fan motor 30. At this time the normally open contacts $29_{a1}$, $29_{a2}$ are closed, causing the main control unit 40 to be connected to the A.C. source 25. Referring to the main control unit 40, the switch 7a interlocking operated with the cooking switch 7 is rendered conducting. At this time a control signal is issued from the FF circuit 180 to the clear signal generator 190, which in turn sends forth a clear signal to the counter 120 to clear its contents. The read-write command circuit 70 issues a "read" command, causing the clock pulse generator 100 to deliver encoded clock pulses to the counter 120 at the rate of one pulse per minute through the operation of the analog switch 90. The counter 120 counts bits constituting the encoded clock pulse. The counted binary cooking time signal is supplied to the decoder-driver circuit 139 and read-write circuit 60. As a result, the contents of the counter 120 are indicated on the display device 4 through the decoder-driver circuit 130.

When supplied with a read command, the read-write circuit 60 successively reads out the contents of the RAM 80 upon receipt of a clock pulse from the counter 120. A encoded power level signal thus read out is decoded by the decoder 150 to be converted into the original power level signal. The encoded power level signal is made into an analog power level control signal by the duty-defining circuit 160. Upon receipt of the power level control signal, the thyristor-actuating circuit 170 is put into operation, to control the operation of the bidirectional thyristor 27. In other words, power supply to the magnetron 35 is controlled, enabling cooking to be made at a desired power level.

A binary power level signal read out by the read-write circuit 60 is indicated on the display device 4 through the decoder-driver circuit 140. A binary clock pulse is also indicated on the display device 4 through the decoder-driver circuit 130. The condition in which a foodstuff is being cooked can be recognized from the above-mentioned indications on the display device 4. A binary cooking stop signal later read out by the read-write circuit 60 is decoded into an analog cooking stop signal by the decoder 150. Since, at the time, the FF circuit 180 is reset, the clear signal generator 190 sends forth a clear signal to the counter 120 to clear its contents. This condition provides preparations for the succeeding input of data included in a cooking program.

When the FF circuit 180 is reset, the second electromagnetic switch 38 ceases to be operated. The normally open contact 38a of said switch 38 regains its original conditions, releasing the self-sustaining circuit of the first electromagnetic switch 29. When, the normally open contacts 29$_{a1}$, 29$_{a2}$ are brought back to the original condition. The main control unit 40 is electrically cut off from the A.C. source 25, and power supply to the magnetron 35 is stopped. Thus, all cooking operation based on a cooking program written in the cooking card is brought to an end.

FIG. 18 is an oblique view of a high frequency heating apparatus according to another embodiment of this invention. In this embodiment, the display device 4 of FIG. 1 is replaced by a cathode ray tube (hereinafter abbreviated as "CRT"). The CRT 200 is provided in the upper part of the control panel 3 to be used as a display unit. The CRT 200 displays the entire cooking program at once and also the individual currently applied items of said cooking program in a different mode from the aforesaid display device 4. FIG. 19 illustrates a concrete display pattern on the CRT 200.

Referring to FIG. 19, indications resulting from scanning carried out in the direction of the X axis represent cooking periods ranging from 1 to 12 minutes. Indications resulting from scanning carried out in the direction of the Y axis denotes data on the power levels applied and the stoppage of cooking. The display circuit (FIG. 20) of the CRT 200 further comprises a read-write control circuit 210, counter 250, analog switch 230, clock pulse generator 240, and comparator 260 in addition to the circuit elements of FIG. 8.

Referring to FIG. 20, the read-write circuit 210 receives a binary power level signal and binary cooking stop signal from the encoder 50. When supplied with a "write" or "read" command from the read-write command circuit 70, the read-write circuit 210 causes the binary power level signal and binary cooking stop signal to be written in a display memory unit, for example, RAM 220 or to be read out therefrom.

Like the RAM 80 of the preceding embodiment, the RAM 220 has a memory capacity of "0" to "11" addresses. A binary cooking time signal delivered from the cooking card-reading device 15 is supplied to an analog switch 230. When a clock pulse generator 240 issues clock pulses at the rate of one pulse per 10 milliseconds and a "write" command is issued from the read-write command circuit 70, then the analog switch 230 selects a cooking time signal. When a "read" command is produced from said read-write command circuit 70, then the analog switch 230 selects a clock pulse.

The clock pulse generator 240 is formed of, for example, an unstable multivibrator, with this clock pulse generator 240, the selective operation of resistors 241, 242 having different levels of resistance by a changeover switch 243 enables clock pulses to be generated at the frequency of 1 (pulse/10 msec) or 1 (pulse/msec). A cooking time signal or clock pulse selected by the analog switch 230 is conducted to a counter 250 to be converted into a binary code. The binary coded cooking time signal or clock pulse is supplied to the read-write circuit 210 and also to a digital comparator 260 and digital-analog converter 270 (hereinafter referred to as "a D-A converter"). The digital comparator 260 is supplied with counts made by the counter 120. When coincidence arises between the contents of the counter 120 and those of the counter 250, the digital comparator is put into operation. At this time, the changeover switch 243 has its contact operation shifted, thereby causing the clock pulse generator 240 to issue clock pulses at a frequency changed from 1 (pulse/10 m sec) to 1 (pulse/m sec). When coincidence takes place between the contents of the counter 120 and those of the counter 250, namely, when a power level corresponding to data on any selected cooking time or cooking temperature included in the cooking program coincides with the current cooking condition, then that portion of the cooking program displayed on the CRT 200 which corresponds to the current cooking condition is more distinctly illuminated due to modulation of brightness.

A binary cooking time signal or binary clock pulse supplied from the counter 250 to the read-write circuit 210 is used as an address-designating signal with respect to the RAM 220. A binary cooking time signal or binary clock signal supplied from the counter 250 to the D-A converter 270 is converted into an analog quantity by said D-A converter 270. The converter analog quantities are further amplified by a Y axis amplifier 300 to be used as Y axis scanning signals, that is, a power level display signal and cooking stop signal and delivered to the CRT 200.

When data included in the cooking program is supplied, a binary power level signal and binary cooking stop signal delivered from the encoder 50 are stored in the RAM 220, as is the RAM 80, according to a binary cooking time signal supplied from the counter 250. At the commencement of cooking, an X axis scanning signal based on a binary clock signal issued at the frequency of 1 (pulse/10 m sec) is supplied to the CRT 200. Further, a Y axis scanning signal based on a binary power level signal and binary cooking stop signal read out of the RAM 220 upon receipt of a clock pulse issued at the frequency of 1 (pulse/10 m sec) is delivered to the CRT 200. When the addresses of "0" to "11" of the RAM 220 are designated by numbers of binary clock pulses counted on the counter 250, then this counter 250 is cleared of its contents. Cooking periods of 1 to 12 minutes are successively displayed on the CRT 200 by an X axis scanning signal. Power levels of "HIGH" to "0" and stoppage of cooking area successively displayed on the CRT by a Y axis scanning signal.

With a high frequency heating apparatus according to the second embodiment of this invention which is arranged as described above, the entire cooking program is displayed on the CRT 200 as shown in FIG. 19 and can be recognized at a glance. When coincidence arises between the contents of the counter 250 and those of the counter 120, that is, any of the indications on the CRT 200 coincides with a current cooking condition, then a clock pulse having a long frequency of 1 (pulse/m sec) is issued from the clock pulse generator 240, causing that portion of a cooking program displayed on the CRT 200 which corresponds to a current cooking condition to be more distinctly illuminated due to the resultant modulation of brightness, thereby enabling the current cooking condition to be easily recognized at a glance.

The CRT 200 of FIG. 19 indicates correlation between cooking periods and the corresponding power levels. Where, however, cooking temperature is shown in the X axis of the CRT 200 by cooking temperature-selecting data as in the preceding embodiment, it is obviously possible to indicate correlation between cooking temperatures and the corresponding power level.

FIG. 21 shows the arrangement of a diode matrix used with a high frequency heating apparatus according to a third embodiment of this invention in place of the CRT 200 of FIG. 19. The display device 400 of FIG. 21 is formed of a large number of light-emitting diodes. Twelve light-emitting diodes 401 corresponding to cooking periods of 1 to 12 minutes are arranged in each of twelve X-axis rows. Twelve light-emitting diodes corresponding to power levels of "HIGH" to "0" and a cooking stop grauduation are arranged in each of twelve Y axis columns. The light-emitting diode matrix 400 has a concrete arrangement illustrated in FIG. 22, and is operated in substantially the same manner as the CRT 200.

The selected one 411 of the transistors included in an X-axis driver circuit 410 is rendered conducting. The selected one 422 of the transistors included in a Y-axis driver circuit 420 are rendered conducting. As a result, a light-emitting diode 401 representing a power level of "HIGH" corresponding to a cooking period of 1 minute is energized. The light-emitting diode matrix 400 has a circuit arrangement shown in FIG. 23. The parts of FIG. 23 the same as those of FIG. 20 are denoted by the same numerals, description thereby being emitted. At the commencement of cooking, a binary power level signal read out by the read-write circuit 210 is supplied to the light-emitting diode matrix 400 through a Y-axis decoder 430 and Y-axis driver 440. The third embodiment of FIG. 21 comprises a clock pulse generator 450 for sending forth clock pulses having a frequency of 1 (pulse/m sec) and clock pulses having a frequency of 1 (pulse/sec). A clock pulse having a frequency of 1 (pulse/m sec) is supplied to the analog switch 230. A clock pulse having a frequency of 1 (pulse/sec), together with an output signal from the digital comparator 260, is delivered to the AND circuit 470, which is also supplied with a binary clock pulse sent forth from the counter 250 through an X-axis decoder 480. An output signal from the AND circuit 470 is conducted to the light-emitting diode matrix 400 through an X-axis driver circuit 490.

When coincidence is established between the contents of the counter 250 and those of the counter 120, then that portion of the light-emitting diode matrix 400 which corresponds to the current cooking condition is made to flicker at an interval of one second by an output signal from the AND circuit 470. With the above-mentioned third embodiment, the current cooking condition is displayed by the flickering of a light-emitting diode. However, it is possible to display the current cooking conditon by modulation of brightness or changing the color of illuminated light through application of a light emitting diode (LED) which changes the color of emitted light according to the magnitude of current applied. Power levels corresponding to cooking temperatures can be displayed by data for selecting the cooking temperatures as in the embodiment of FIG. 19.

There has been described the process by which application of power levels corresponding to cooking periods is controlled. Reference is now made to the manner in which application of power levels corresponding to cooking temperatures is controlled.

Referring to FIG. 24, a cooking card 500 is provided with a cooking program which includes cooking temperature (C°) graduations 501 relative to a foodstuff being cooked, corresponding power level graduations 502 and cooking stop graduation 503. With the embodiment of FIG. 24, power levels are controlled according to the detected temperature of a foodstuff in the process of being cooked (hereinafter referred to as "a foodstuff temperature"). In other words, the foodstuff temperature is controlled to match that level indicated in the cooking program of the cooking card 9 which corresponds to a particular point of time during cooking. A power level is adjusted to conform to said controlled foodstuff temperature, thereby effecting proper cooking. With the rectangular cooking card of FIG. 24, digital data 504 on cooking temperatures and cooking temperature-selecting digital data 505 are preset in the lengthwise direction, as in the cooking card of FIG. 2.

In the above-mentioned case, a temperature-detecting probe provided with a thermistor 510 is inserted into a foodstuff being cooked. Voltage variations resulting from changes in the resistance of said thermistor 510 are converted into binary codes by an analog-digital converter 520 (hereinafter referred to as "an A-D converter") as shown in FIG. 25 (which shows a modification of the circuit arrangement of FIG. 8). The converted binary codes are supplied to the read-write circuit 60 through an analog switch 530, which receives binary temperature signals from a counter 540. When the read-write command circuit 70 issues a "read" command, the analog switch 530 selectively sends forth a detected binary temperature signal delivered from the A-D converter 520. The detected binary temperature signal is used to designate a particular one of the addresses of the RAM 80. The respective items of the cooking program preset in the cooking card and the addresses of the RAM 80 in which said items are to be stored have such correlation as illustrated in FIG. 26. When the detected foodstuff temperature indicate 40° C. and over (up to 44° C.), the corresponding power level stands at "HIGH". This power level data is stored in the address "0" of the RAM 80. Similarly, data on a power level of "HIGH" corresponding to the detected foodstuff temperature of 45° C. and over (up to 49° C.) is stored in the address of "1". Data on a power level of "6" corresponding to the detected foodstuff temperature of 50° C. and over (up to 54° C.) is stored in the address of "2". Data on a power level of "6" corresponding to the detected foodstuff temperature of 55° C. and over (up to 59° C.) is stored in the address of "3". Data on a power level of "4" corresponding to the detected foodstuff temperature of 60° C. and over (up to 64° C.) is stored in the address of "4". Data on a power level of "4" corresponding to the detected foodstuff temperature of 65° and over (up to 69° C.) is stored in the address of "5". Data on the stoppage of cooking corresponding to the detected foodstuff temperature of 70° C. is stored in the address of "6".

The detected foodstuff temperature, binary codes thereof and corresponding numbers of the addresses of the RAM 80 have such correlation as illustrated in FIG. 27. Namely, a binary code of "0000" corresponding to a detected foodstuff temperature lower than 45° C. is stored in the address "0" of the RAM 80. Similarly, a binary code of "0001" corresponding to a detected foodstuff temperature ranging from 45° to 49° C. is stored in the address "1". A binary code of "0010" corresponding to a detected foodstuff temperature ranging from 50° to 54° C. is stored in the address "2". A binary code of "0011" corresponding to a detected foodstuff temperature ranging from 55° to 59° C. is stored in the address "3". A binary code of "0100" corresponding to a detected foodstuff temperature ranging from 60° to 64° C. is stored in the address "4". A binary code of "0101" corresponding to a detected foodstuff temperature ranging from 65° to 69° C. is stored in the address "5". A binary code of "0110" corresponding to a detected foodstuff temperature ranging from 70° to 74° C. is stored in the address "6". A binary code of "0111" corresponding to a detected foodstuff temperature ranging from 75° to 79° C. is stored in the address "7". A binary code of "1000" corresponding to a detected foodstuff temperature ranging from 80° to 84° C. is stored in the address "8". A binary code of "1001" corresponding to a detected foodstuff temperature of 85° C. and over is stored in the address "9".

There will now be described by reference to FIG. 28 the arrangement and operation of a high frequency heating apparatus according to still another embodiment of this invention. With this embodiment, the cooking card-reading device 15 of FIG. 7 is further provided with a cooking card-shifting unit 600. This cooking card-shifting unit 600 has a circuit arrangement shown in FIG. 29. When a temperature-detecting probe (not shown) is provided with a thermistor 610, voltage variations resulting from changes in the resistance of said thermistor 610 are converted into binary codes by an A-D converter 620. When the main control unit 40 sends forth a cooking start signal to a sampling circuit 630, then a detected foodstuff temperature signal delivered from the A-D converter 620 is sampled at one second intervals after commencement of cooking. The sampled foodstuff temperature is supplied to an analog switch 640. When the sampled foodstuff temperature indicates 40° C., a binary code of "0000" is stored in the corresponding address "0" of a memory 650 in accordance with the table of FIG. 27. When a detected foodstuff temperature sampled one second later indicates 50° C., then a binary code of "0010" is stored in the address "2" of a memory 660 in accordance with the table of FIG. 27. The stored data of the memory 650 is subtracted from the stored data of the memory 660 by a subtracter 670. A value of "2" corresponding to a difference of 10° C. between both memory contents is supplied to a pulse signal generator 680, which in turn produces a pulse signal corresponding to the abovementioned value of "2". When supplied with said pulse signal, a pulse motor 690 is rotated to an extent corresponding to said value of "2". As a result, a cooking card 800 is made to travel for a distance of two columns thereof to compensate for the aforesaid temperature difference of 10° C. Accordingly, a power level corresponding to a detected foodstuff temperature is read out for proper control. The pulse motor 690 rotates transport rollers 700 (FIG. 30) provided in a passage 51 extending through the cooking card inlet 5.

A cooking program written in the cooking card 800 inserted into the inlet 5 has a pattern illustrated, for example, in FIG. 31. The cooking card-shifting unit 600 automatically supplies that data of the cooking program which corresponds to a detected foodstuff temperature. The cooking card 800 of FIG. 31 need not be provided with cooking time data (FIG. 2) marked with, for example, conductive pencil lead, nor with digital data corresponding to cooking temperatures. In other words, data given in a cooking program written in the cooking card 800 is successively read out, as said card 800 is let to travel further with lapse of time.

When data on a foodstuff temperature is selectively used, power levels corresponding to changing foodstuff temperatures are read out of a cooking program preset in the cooking card 800, as it is made to travel onward. Upon completion of cooking, the memories 650, 660 are cleared of the contents. At this time, the main control unit 40 sends forth a reset signal to the pulse motor 690, which in turn makes a reverse rotation. As a result, the cooking card 800 is let to travel backward to its original position.

The embodiment of FIG. 28 is so designed that when the cooking card 800 shown in FIG. 31 is inserted into the inlet 5, that data of a cooking program which corresponds to the foremost column of the cooking card 800 never fails to be read out first.

Where for example it is desired to maintain a foodstuff temperature at, for example, 60° C., it is advised to preset a power level at "0" with respect to that column of the cooking card 800 of FIG. 31 which represents a foodstuff temperature ranging from 60° to 64° C. A power level of "6" is specified for a sensed temperature range of 55° C. to 59° C. When, therefore, the foodstuff temperature falls below 60° C., the power level changes from "0" to "6". The power level of "6" brings the foodstuff temperature up to 60° C. When the temperature rises above 60° C., the power level is again reduced to "0". Thus the foodstuff temperature will be maintained at 60° C. by the application of power level 6 whenever the temperature falls below 60° C.

Binary codes corresponding to high foodstuff temperatures are stored in the memory 650 of FIG. 29. Binary codes denoting lower foodstuff temperatures are stored in the memory 660 of FIG. 29. Since subtractor 670 is so designed as to always subtract the contents of the memory 650 from those of the memory 660, a balance obtained from said subtractor 670 has a negative value, causing the pulse motor 690 to make a reverse rotation. Accordingly, the cooking card 800 travels backward, thereby maintaining the foodstuff temperature substantially at 60° C., with a temperature deviation restricted to 5° C. or less.

Referring to FIG. 29, a first sampled foodstuff temperature is stored in the memory 650, and the succeeding sampled foodstuff temperature is stored in the memory 660.

The foregoing description refers to the control of a power level relative to a foodstuff temperature. The control of a power level relative to a cooking period is effected by successively reading data out of a cooking program preset in a cooking card upon receipt of a clock pulse from the clock pulse generator 100.

With a high frequency heating apparatus according to the embodiment of FIG. 28, a cooking program showing particular cooking temperature and corresponding power levels is preset in a cooking card in which cooking temperatures falling within a specified range are indicated in a regular order with reference to the cooking periods arranged also in a regular order. High frequency waves are applied to a foodstuff being cooked in a cooking chamber at a desired power level. As cooking proceeds, the cooking card is progressively shifted to provide a power level corresponding to a currently detected foodstuff temperature. The embodiment of FIG. 28 comprises a device for successively reading data out of the cooking program preset in the aforesaid cooking card. The subject high frequency heating apparatus is operated in accordance with a signal denoting a particular power level given in the cooking program which is delivered from the cooking program-reading device. When data on the desired cooking temperatures and corresponding power levels given in the cooking program are supplied by the progressive shifting of the cooking card, various kinds of foodstuff can be cooked easily under a proper condition. Further with respect to the same kind of foodstuff, a high frequency heating apparatus according to the embodiment of FIG. 28 can be repeatedly operated with high reproducibility.

What is claimed is:
1. In a high frequency heating apparatus including means for digitally controlling the conditions under which a foodstuff is to be cooked, the improvement comprising:
cooking card means having (a) timing and temperature indicia written along a first edge thereof and power level indicia along another edge thereof thereby defining a matrix array having a plurality of regions, each region indicating a cooking condition corresponding to either a time and power level combination or to a temperature and power level combination, one or more regions of said matrix array being selected and marked to establish data corresponding to desired cooking conditions, and (b) a data area separate and distinct from said timing, temperature and power level matrix array for selecting either said temperature indicia or said timing indicia to be used in conjunction with said power level indicia,
cooking card-reading means for reading the regions marked on the cooking card means;
memory means for storing data corresponding to the regions marked on said card means and read therefrom by said cooking card-reading means and
display means for displaying time, temperature and power levels data defined by the regions marked on said card means and read therefrom.

2. An improvement according to claim 1, wherein data on the cooking time and foodstuff temperature are marked with a conductive recording medium, thereby providing power levels corresponding to the cooking conditions.

3. An improvement according to claim 1, wherein the display means is formed of a liquid crystal type.

4. An improvement according to claim 1, wherein the display means is formed of a cathode ray tube to indicate all the data of the cooking conditions.

5. An improvement according to claim 1, wherein the display means comprises a light-emitting diode matrix to indicate all the data of the cooking conditions.

6. An improvement according to claim 1, wherein data on the cooking conditions is read out by the cooking card-reading means when a conductive portion marked on the cooking card is rendered conducting by contact with a brush.

7. In a high frequency heating apparatus including means for digitally controlling the conditions under which a foodstuff is to be cooked, the improvement comprising:
cooking card means having (a) timing and temperature indicia written along a first edge thereof and power level indicia along another edge thereby defining a matrix array having a plurality of regions, each region indicating cooking conditions corresponding to either a time and power level combination or to a temperature and power level combination, one or more regions of said matrix array being selected and marked to establish data corresponding to desired cooking conditions, and (b) a data area separate and distinct from said timing, temperature and power level matrix array for selecting either said temperature indicia or timing indicia,
cooking card-reading means for reading the regions marked on said cooking card means;
memory means for storing the cooking conditions marked on and read from the cooking card by said cooking card-reading means;
cooking card-shifting means for shifting the cooking card to cause the cooking conditions thereof to be progressively read out by said cooking card-reading means; and
display means for displaying time, temperature and power level data defined by the regions marked on said cooking card means and read therefrom.

8. An improvement according to claim 7, wherein the cooking card-shifting means comprises:
a heat-sensitive resistor for detecting a temperature of a foodstuff being cooked;
an analog-digital converter for converting an analog signal supplied from said heat sensitive resistor into a digital quantity;
a sampling circuit for sampling said digital quantity provided by said analog-digital converter at a prescribed sampling rate;

an analog switch for selectively storing a first sampled data supplied from the sampling circuit in a first memory and a second sampled data supplied from said sampling circuit in a second memory;

a subtractor for subtracting the contents of the first memory from those of the second memory;

a pulse signal generator for generating a pulse signal in accordance with the value of an output signal from the subtractor; and a pulse motor for driving cooking card-transporting rollers when supplied with a pulse signal from the pulse signal generator, said transporting rollers adapted to move said cooking card means.

9. A high frequency heating apparatus including means for digitally controlling the conditions under which a foodstuff is to be cooked comprising:

a cooking card having (a) timing and temperature indicia written along a first edge thereof and power level indicia along another edge thereof thereby defining a matrix array having a plurality of regions, each region indicating cooking conditions corresponding to either a time and power level combination or to a temperature and power level combination, one or more regions of said matrix array being selected and marked to establish data corresponding to desired cooking conditions and (b) a data area separate and distinct from said timing, temperature and power level matrix array for selecting either said temperature indicia or timing indicia;

cooking card reading means for reading the regions marked on said cooking card;

memory means for storing the cooking conditions marked on and read from the cooking card by said cooking card reading means;

display means for displaying time, temperature and power level data defined by the regions marked on said cooking card means and read therefrom;

cooking card shifting means for shifting the cooking card to cause the cooking conditions thereof to be progressively read out by said cooking card reading means, said cooking card shifting means comprising a heat-sensitive resistor for detecting a temperature of a foodstuff being cooked;

an analog-digital converter for converting an analog signal supplied from said heat-sensitive resistor into a digital quantity;

a sampling circuit for sampling said digital quantity provided by said analog-digital converter at a predetermined sampling rate;

an analog switch for selectively storing a first sampled data supplied from the sampling circuit in a first memory and a second sampled data supplied from said sampling circuit in a second memory;

a subtractor for subtracting the contents of the first memory from the contents of the second memory;

a pulse signal generator for generating a pulse signal in accordance with the value of an output signal from the subtractor; and a pulse motor for driving cooking card transporting rollers when supplied with a pulse signal from the pulse signal generator, said transporting rollers adapted to move said cooking card means.

* * * * *